United States Patent [19]

Schaub

[11] 4,217,331

[45] Aug. 12, 1980

[54] DISPOSABLE FLOAT DISPENSER

[75] Inventor: Charles T. Schaub, Woodcliff Lake, N.J.

[73] Assignee: Coleco Industries, Inc., Hartford, Conn.

[21] Appl. No.: 948,044

[22] Filed: Oct. 2, 1978

Related U.S. Application Data

[63] Continuation of Ser. No. 816,281, Jul. 18, 1977, abandoned.

[51] Int. Cl.² .......................................... B01D 11/00
[52] U.S. Cl. ........................................ 422/265; 221/1; 222/160; 210/169; 422/264; 422/275; 422/277
[58] Field of Search ............... 422/265, 266, 275, 277, 422/264 B, 263; 221/1; 222/160; 210/169; 239/310

[56] References Cited

U.S. PATENT DOCUMENTS

| | | | |
|---|---|---|---|
| 270,569 | 1/1883 | Hoffman | 422/263 |
| 942,836 | 12/1909 | Leonard | 422/265 |
| 2,826,484 | 3/1958 | Buehler | 422/265 |
| 2,976,129 | 3/1961 | Buehler | 422/265 |
| 3,595,786 | 7/1971 | Horvath | 422/264 B |
| 3,684,460 | 6/1972 | Arneson | 422/265 |
| 3,792,979 | 2/1974 | Clinton | 422/264 B |
| 3,846,078 | 11/1974 | Brett | 422/264 B |
| 3,924,807 | 12/1975 | Morgan | 422/265 |

FOREIGN PATENT DOCUMENTS 2227940  3/1973  Fed. Rep. of Germany .......... 210/169

*Primary Examiner*—Michael S. Marcus

[57] ABSTRACT

A float dispenser is adapted to be floated in a body of water such as a swimming pool, to dispense in the water a soluble solid material carried by the dispenser. The dispenser includes a flotation element from which an apertured receptacle is supported below the water. The receptacle is divided into separate compartments. A single tablet of water soluble material is located within each compartment so that the tablet segregated from the other tablets to expose its maximum surface areas to the surrounding water. The dispenser may be made of two identical integral half sections of molded plastic material which are locked together to lock the tablets within their individual compartments. After dissolution of the tablets, the dispenser may be discarded and replaced with another.

12 Claims, 3 Drawing Figures

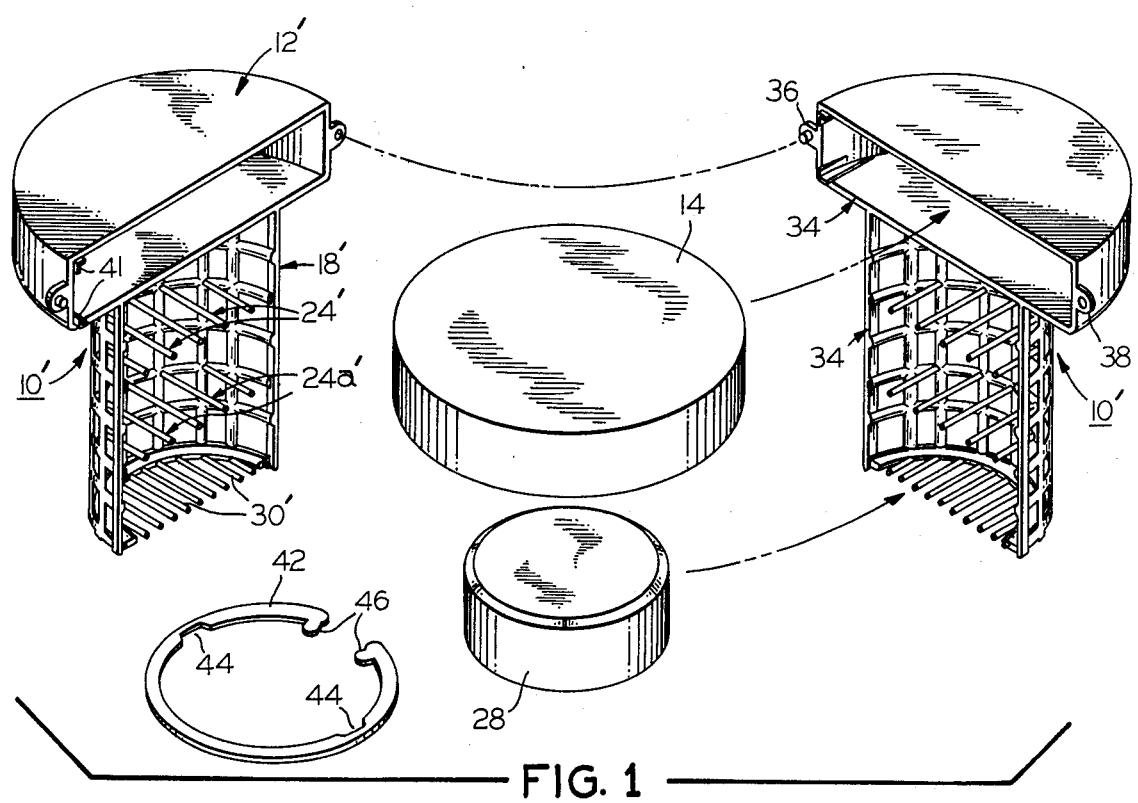
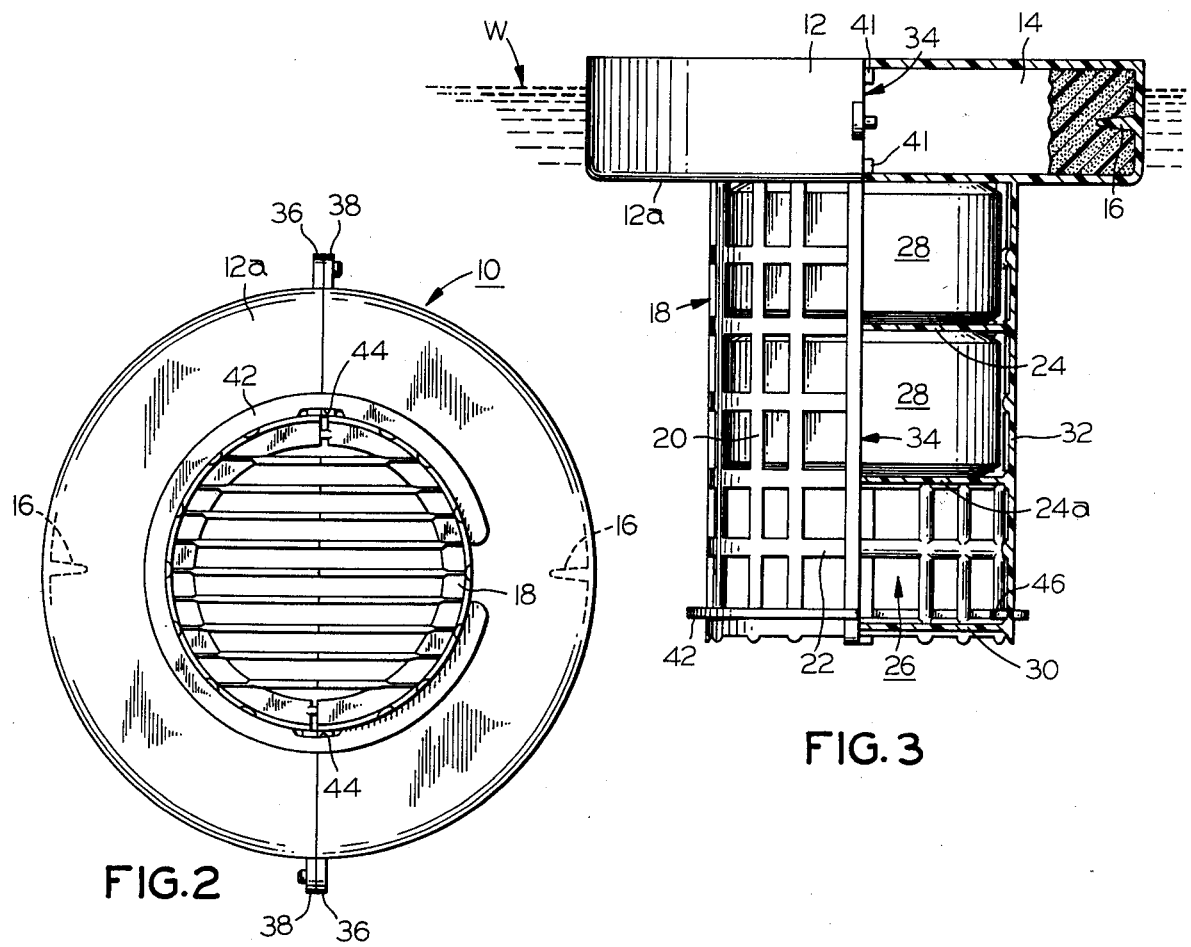

DISPOSABLE FLOAT DISPENSER

CROSS REFERENCE TO RELATED APPLICATION

The present application is a continuation of copending Application Ser. No. 816,281 filed July 18, 1977 entitled DISPOSABLE FLOAT DISPENSER AND METHOD OF MAKING SAME, now abandoned.

BACKGROUND OF THE INVENTION

The present invention concerns a float dispenser for dispensing materials such as water soluble chemicals into a body of water. The invention is particularly applicable to a float dispenser for swimming pools in which the dispenser contains a water soluble chemical, for example, a chemical which releases chlorine or a chlorine-containing compound into the swimming pool water.

Float dispensers of this general type are, of course, old and well-known in the art, particularly insofar as swimming pool float dispensers are concerned. For example, U.S. Pat. No. 3,792,979 shows a disposable swimming pool chlorinator in the form of a one-piece, blow-molded plastic container which has a relatively large upper flotation chamber and a depending foraminous neck portion within which a plurality of chlorine tablets are disposed. Air trapped in the upper portion floats the device in the water.

U.S. Pat. No. 3,598,536 shows a flotation device in which the position of the receptacle which contains the mass of chemical charge is adjustable relative to the float collar from which it depends whereby the chemical charge may be submerged to a selected depth of water. A somewhat similar concept is shown in U.S. Pat. No. 3,677,711.

U.S. Pat. No. 2,934,409 shows a float and receptacle combination which is so weighted that, with a fresh chemical charge contained in it, it sinks to the bottom of the swimming pool and, upon dissolution of the charge, floats back to the surface thus signalling that the charge has been exhausted.

A very old patent, U.S. Pat. No. 942,836, shows a cage having hinged doors which open to receive therein a charge of chemical balls. The cage is adapted to be mounted by hooks to the pipes of a boiler, the chemical balls dissolving in the water to assist in scale removal.

Other patents which show various typical dispenser devices are U.S. Pat. Nos. 2,826,484; 2,950,959; 2,976,129; 3,390,695; 3,483,989 and 3,846,078. Of the foregoing, Patent 2,976,129 is of interest as showing a separate sediment chamber formed as part of the receptacle containing the chemical.

Generally, one disadvantage associated with prior art float dispenser devices has been a tendency for insufficient or erratic dissolution of the chemical charge into the water because the various tablets, balls or other shape comprising the charge tend to agglomerate together thus reducing the total surface area exposed to the water.

Another difficulty has been the inconvenience attendant to utilizing the prior art dispensers. Generally, utilization required opening the dispenser, removing any residual chemical charge and replacing a fresh chemical charge therein. This necessitated handling chemicals such as chlorine releasing swimming pool tablets which are often unpleasant and unsafe to have in direct contact with the skin or to handle excessively.

Another difficulty with some prior art float dispensers has been the requirement to manufacture a relatively large number of parts to provide a removable closure or other means to permit access to the dispenser for replacing the chemical charge. This often resulted in such dispensers being relatively expensive.

It is, accordingly, an object of the present invention to provide a novel float dispenser of simple and inexpensive construction which retains a chemical charge of tablets or the like in segregated, spaced apart relationship so as to expose substantially the entire surface of the tablet or the like to the water in which the dispenser is floated.

It is another object of the present invention to provide a novel and improved float dispenser essentially made from two identical plastic molded half sections.

It is another object of the present invention to provide a novel and improved disposable float dispenser which contains one or more water-soluble material tablets locked within an apertured receptacle forming part of the dispenser, which dispenser is inexpensive and disposable, i.e., is designed to be discarded after its chemical charge is exhausted, thus avoiding the necessity of handling replacement chemical charges.

Other objects and advantages of the present invention will become apparent from the following description.

SUMMARY OF THE INVENTION

In accordance with the present invention, there is provided, in a float dispenser, the combination comprising a floatation element comprised of cooperating members non-releasably locked together and having a lower wall portion and a density less than that of water, and a receptacle element extending below the lower wall portion and supported by the floatation element. The receptacle element has an outer wall defining an enclosure and having apertures in it for passage of water through the provided enclosure. The receptacle element has at least one divider disposed within and extending across the enclosure and dividing it into at least two storage compartments, each having the apertures in their outer wall for passage of water through each of the compartments. The combination further includes one or more tablets of water-soluble material disposed within the receptacle, each of the compartments containing not more than one of the tablets. The dispenser is disposable and the divider cooperates with the outer wall to fully enclose the compartments whereby to retain and segregate each tablet within its associated compartment. In accordance with one aspect of the invention, the tablets comprise a water soluble chlorine releasing material.

Certain objects of the invention are attained by providing for the receptacle to be supported by the lower wall portion of the floatation element and to cooperate with it to form the enclosure. The receptacle element is preferably in the form of a cage and the at least one divider is provided by spaced apart members attached to the inner surface of the outer wall of the receptacle and extending inwardly across the receptacle.

Other objects of the invention are provided by the dispenser being disposable with the receptacle element being comprised of at least two cooperating members which are non-releasably locked together to retain the charges within their respective compartments. Other objects of the invention are attained by having the dispenser composed of two substantially indentical half sections, each half section having a mating edge and comprising a half floatation element, and a half-receptacle element, the combination further including respective connector means on the half sections which cooperate to lock the half sections together in abutting contact along their respective mating edges whereby the half sections cooperate to form the dispenser. The half sections are each preferably comprised of molded plastic material, and each half section preferably includes a hollow half floatation element, a half receptacle element, at least one of a half divider means within the receptacle element, and at least first and second locking means on the half section, disposed at spaced apart locations adjacent the mating edge. The combination may further include a lock ring engaging both the half receptacle elements to lock the half receptacle elements together. When a hollow floatation element is used, a float member having a density less than that of water is disposed within the hollow floatation element.

Certain objects of the invention are attained when the float dispenser is made of a pair of half sections of molded plastic material locked together to form a disposable float dispenser, the floatation element being a hollow chamber having a float member therein and the receptacle element being an outer wall defining a cage enclosure having openings therein.

The invention also provides a method of manufacturing a float dispenser comprising: making at least two identical half sections of plastic material, each half section having a mating edge and comprising a half floatation element having density less than that of water and a half receptacle element. The half receptacle element has an outer wall with apertures formed therein for passage of water therethrough and includes at least one half-divider means extending across the half receptacle element to divide the half receptacle element into at least two half compartments, each having said apertures therein. The method includes inserting a charge of water soluble material into at least one of the half compartments and then positioning two of the half sections in mating edge to mating edge abutment with their respective half floatation elements in juxtaposition and their respective half receptacle elements in juxtaposition, with at least one of the charges contained therebetween. Finally, the step of locking the half sections together to comprise the float dispenser, with the at least one charge retained within a compartment formed by the juxtaposition of two of said half compartments, is carried out.

The method attains certain objects of the invention when it includes making the half floatation element in the form of a hollow half chamber and inserting into the half chamber a float member of a density less than that of water prior to carrying out the positioning step. The method of the invention may further include the step of making a lock ring and locking the half receptacle elements together by means of the lock ring.

BRIEF DESCRIPTION OF THE DRAWINGS

FIG. 1 is an exploded perspective view of one embodiment of a float dispenser in accordance with the present invention;

FIG. 2 is a larger scale rendition showing a bottom view of the dispenser of FIG. 1 in the assembled condition; and FIG. 3 is a side elevation, partly in section, of the float dispenser of FIG. 2.

DESCRIPTION OF THE PREFERRED EMBODIMENT

Referring jointly to FIGS. 2 and 3, the float dispenser of the invention is generally indicated at 10 and includes a floatation element 12 within which a float member 14 is contained. Float member 14 may be made of any buoyant material, i.e., one having a density less than water. For example, suitable buoyant materials to float dispenser 10 in a swimming pool are foamed plastic materials such as rigid polyurethane foam or rigid polystyrene foam. Obviously, any other suitable materials such as cork, etc. may be employed. Float element 12 is seen to be hollow and to be formed with spike-like projections 16 formed therein. Upon insertion of float member 14 within floatation element 12, the foamed plastic or cork, etc. material of float member 14 is impaled on projections 16 to position member 14 place.

Floatation element 12 has a lower wall portion 12a to which is attached an apertured receptacle 18 which depends from lower wall 12a. Apertured receptacle 18 is provided, in the embodiment shown, by what is essentially a substantially cylindrical shaped basket having generally vertically extending (as viewed in FIG. 3) bars 20 and horizontally extending (as viewed in FIG. 3) cross bars 22 providing the peripheral wall and the bottom bars 30 providing the bottom wall, these several bars together defining the outer wall of the basket enclosure. Divider means 24, 24a (FIG. 3) are disposed within receptacle 18 and serve to divide it into three segregated, apertured storage compartments 26, only the lowermost of which, which is depicted as being empty, is numbered in FIG. 3. The two uppermost compartments 26 (not numbered in FIG. 3) each respectively contain a single tablet 28 therein. Each compartment contains not more than one tablet. Tablet 28 may comprise any suitable solid material which is soluble in water. For use in a swimming pool, tablet 28 may be any water soluble solid material which releases a desired chemical or chemicals into the swimming pool water. For example, tablets 28 may comprise a water soluble material which releases chlorine or a chlorine containing compound and/or a cyanuric acid compound into the water, e.g., tablets 28 may comprise tablets of trichloro-s triazinetrione.

Obviously, one, both or all three of compartments 26 shown in the embodiment of FIG. 3 may optionally have a tablet 28 placed therein. Each of compartments 26 is seen to have, in effect, a floor and an outer peripheral wall which cooperate to retain and segregate within the compartment a tablet or other charge of solid, soluble material. The divider and outer wall cooperate to fully enclose the compartments whereby to retain and segregate each tablet within its associated compartment as shown in the drawings. The floor of the lowermost compartment 26 is provided by the bottom 30 of receptacle 18. The outer wall of each of the compartments 26 is provided by a respective segment of outer wall 32 of receptacle 18. Wall 32 is provided with apertures (unnumbered) by bars 20 and crossbars 22. The floor of the central compartment (unnumbered) is provided by divider means 24a, and the floor of the topmost compartment (unnumbered) is provided by divider means 24. Receptacle 18 generally has the form of a cylindrical basket or cage, with each compartment thereof having a substantially cylindrical shape and being apertured. Obviously, the apertures provide for passage of water through receptacle 18, specifically, through the compartments thereof. Receptacle 18 cooperates with lower wall portion 12a to help define the enclosure provided by receptacle 18.

Referring particularly now to FIG. 1, float dispenser 10 is seen to be comprised of, in the embodiment illustrated, two substantially identical half sections 10', each having a half floatation element 12' and a half receptacle 18' forming part thereof. Preferably, each half section 10' is of unitary integral construction, preferably obtained by molding half section 10' of a suitable plastic material. As used herein and in the claims, the term "plastic" means a synthesized polymeric material such as, for example, polypropolyene, polyethylene, polystyrene, copolymers of one or more of the foregoing, etc. Obviously, any suitable moldable plastic material may be employed.

Each half section 10' has a mating edge 34 which is, generally speaking, the peripheral edge of a half section 10' which is adapted to abut a corresponding mating edge 34 of another half section 10' to which it is joined, as shown in the drawings, to form a complete dispenser.

Each half section 10' has a first locking means 36 and a second locking means 38 integrally formed thereon, the two locking means being spaced apart from each other and each being adjacent a portion of mating edge 34. In the embodiment illustrated, first locking means 36 comprises an ear portion (unnumbered) from which a male locking projection (unnumbered) projects past mating edge 34. Each second locking means 38 comprises a female locking means comprising an ear portion (unnumbered) having formed therein an opening (unnumbered) designed to lockingly receive a male locking member in snap lock engagement. Each half section 10' also has a pair of locating ribs 41 integrally molded therein and projecting slightly beyond its associated mating edge 34 to assist in aligning the two half sections. Half divider means 24' and 24a' are provided in the embodiment illustrated by a plurality of individual projecting ribs or members (unnumbered). Similarly, a half bottom 30' is provided a plurality of individual projecting ribs, also unnumbered.

A lock ring 42 of gapped circular construction is also provided. It has a pair of indentations 44 formed at diametrically opposed positions on its inner periphery and a pair of projecting tabs 46 formed at either end thereof adjacent the gap and projecting inwardly of the periphery of the lock ring.

As indicated by FIG. 1, a float dispenser in accordance with the invention is readily assembled by taking two identical half sections 10' and inserting into the hollow half floatation member 12' of one of them a float member 14 of any suitable water-buoyant material.

Float member 14 is soft enough so that it is impaled upon the projection 16 within the half floatation elements 12 into which it is fully inserted. One or more of the compartments 26 of one of the half sections 10' has a tablet 28 inserted therein. When the desired number of tablets have been inserted up to one in each selected compartment 26, the two half sections 10' are then brought together with their respective mating edges 34 in abutting contact. First locking means 36 of one of the half sections 10' will lockingly engage second locking means 38 of the other half section 10', and vice-versa. Locating ribs 41 assist in properly aligning the two associated half sections of 10' in abutting contact.

Lock ring 42, which is preferably also of integral molded plastic construction, is then inserted around the lower end portion (that end furthest removed from floatation element 12) of the two assembled half sections 10'. This is accomplished by spreading lock ring 42 to widen the gap and slipping it over the assembled half receptacle 18' with indentations 44 fitting over the paired vertical bars 20 whose respective edges define a portion of the respective mating edges 34 of the respective half sections 10'. Tabs 46 will then project inwardly of apertures formed between adjacent other ones of vertical bars 20 when lock ring 42 is released, as seen in FIG. 2.

Obviously, alternate means of locking the half sections together may be employed. For example, the two half sections 10' may be locked together by a suitable adhesive applied between abutting mating edges 34. Alternately, heat or electronic welding of the seam provided by abutting mating edges 34 may be utilized, as well as combinations of any of the foregoing.

Floatation element 12, being filled by float member 14, need not be made waterproof. Obviously, in an alternative form of construction, floatation chamber 12 may be made hollow and not filled with a floatation member 14, and made waterproof so that the buoyancy is provided by the hollow, unfilled space provided within floatation chamber 12. Equally obviously, floatation element 12 may be made of solid water-buoyant material construction.

The two half sections 10', joined together in any suitable manner as described above, cooperate so that the two half floatation elements 12', and the two half receptacles 18' cooperate to form a floatation element 12 and receptacle 18. Similarly, half dividers 24', 24a' and half bottoms 30', together cooperate to form the dividers 24, 24a and bottom 30 of float dispenser 10.

Float chamber 12 is large enough and buoyant enough so that even with each of the three compartments filled by its associated tablet 28, float dispenser 12 will float at the surface of the liquid as indicated by the rendition of a water line W at the left-hand portion of FIG. 3. Lower wall portion 12a is seen to be disposed below water line W as is receptacle 18 which is supported by wall 12a.

Half sections 10' can be injection molded of a relatively inexpensive plastic material such as polyethylene or polypropylene in a one piece integral unit including the various locking means, divider means and locating ribs. Optionally, a supplemental locking part such as locking ring 42 can be provided, also of molded plastic material.

This inexpensive mode of construction permits one-time use of the dispenser so that it may be disposed of after the chemical tablets 28 contained therein are exhausted. Thus, a float dispenser such as illustrated in FIG. 3 can be manufactured with any or all of its compartments 26 containing therein a chemical charge in the form of a tablet, with each tablet segregated and retained within its own apertured compartment through which water will circulate. The user purchases a float dispenser containing the size charge suitable for the size swimming pool he wishes to service and merely drops the float dispenser into the swimming pool. The float dispenser floats on the surface of the pool with the tablets submerged beneath the water line. By virtue of the apertured construction of Receptacle 18, provided in the illustrated embodiment by the cage-like open construction, and the open or apertured construction of the divider means forming the individual apertured or open compartments 26, substantially the entire surface of each of the tablets is exposed to the water, which promotes the desired constant rate of dissolution of the tablets. As the tablets are reduced in size by dissolution into the water, each tablet is maintained segregated within its own compartment with its surface fully exposed to the surrounding water. The tablets accordingly do not coalesce or agglomerate into a mass with concomitant reduction in exposed surface area, as happens with prior art devices.

When the tablets are fully dissolved float dispenser 10 will float higher in the water thus serving as a signal that the chemical charge has been exhausted. The empty dispenser will then be removed and discarded and replaced with a fresh dispenser as needed.

It will be noted that the user need not handle directly the tablets 28 and this provides a useful convenience and safety feature since chemical tablets such as those used in swimming pools are often poisonous and hazardous to handle or place in contact with the skin.

For this reason, the half sections of which the dispenser is preferably made, are preferably non-releasably locked together. As used herein and in the claims, "non-releasably" means that the cooperating members which are non-releasably locked together are not designed for routine opening and reclosing. Obviously, in the illustrated preferred embodiment, the non-releasably locked together half sections 10' could be separated by, in effect, disassembling float dispenser 12 by removing lock ring 42 and prying apart paired locking means 36, 38. However, such locking is deemed to be "non-releasably" done since means for routine opening and reclosing for replacing charges by the consumer are not provided and the structure discourages, even if it is not capable of entirely preventing, such tampering by the consumer.

Obviously, any convenient tablet size and any convenient number of tablets (and therefore number of compartments 26) may be employed.

EXAMPLE

The presently preferred embodiments of the invention are a two-compartment and a three-compartment dispenser of the specific type illustrated in the drawings, all the compartments of which are identically sized to each receive a single tablet of about 5⅓ ounces (151.2 grams) of trichloro-s triazinetrione. The two-compartment dispenser is provided with either one or two tablets and the three-compartment dispenser is provided with three tablets. The size and buoyancy of the float member 14 is such as to float the the dispenser when it is carrying maximum load. Since each tablet of the size described provides sufficient chemical to treat 5,000 gallons of swimming pool water for a period of one week, the dispensers described provide convenient prepackaging of chemicals for treatment of, respectively, 5000, 10,000 and 15,000 gallon capacity swimming pools.

Obviously, for larger pools two or more dispensers may be utilized at the same time to provide the required dosage. Equally obviously, a dispenser with a larger sized tablet (and appropriately sized compartments) and/or a dispenser with more than three compartments and tablets may be provided.

It will be apparent that upon a reading and understanding of the foregoing description, numerous alterations and modifications may be made to the foregoing illustrated embodiment which, nonetheless, are within the spirit of the invention. For one example, the compartments 26 need not all be vertically disposed one above the other, but some may be disposed in side-by-side relationship. It is intended to include all such modifications within the scope of the appended claims.

I claim:

1. In a float dispenser, the combination comprising:
   (a) a flotation element having a lower wall portion and a density less than that of water:
   (b) a receptacle element depending from said lower wall portion of said flotation element and supported thereby, said receptacle element being a generally cylindrical cage comprised of a pair of vertically extending mating semi-cylindrical members locked together, said receptacle element having an outer wall defining an enclosure with apertures disposed over substantially the entire surface thereof for passage of water through the provided enclosure, said receptacle element also including at least one divider disposed within and extending across the full width of said enclosure to divide said enclosure into at least two segregated storage compartments each having said apertures in the outer wall thereof for passage of water through each of said compartments, said divider being provided by portions attached to the inner surface of said outer wall of said semi-cylindrical members and extending inwardly across said enclosure, said divider having apertures therein to permit passage of water therethrough; and
   (c) at least one tablet of water-soluble material disposed within said receptacle, each of said compartments containing not more than one of said tablets; said dispenser being disposable and said divider cooperating with said outer wall to fully segregate said compartments whereby to retain and segregate each said tablet within its associated compartment, said apertures in said outer wall and said divider permitting water to flow through said outer wall and divider into contact with substantially the entire surface of said tablet in any one of said compartments.

2. The dispenser of claim 1 including at least two of said tablets each disposed in separate compartments.

3. The dispenser of claim 1 wherein said receptacle cooperates with said lower wall portion of said flotation element to define said enclosure.

4. The dispenser of claim 1 wherein said portions of said one divider comprise spaced apart members attached to the inner surface of said outer wall and extending inwardly across said receptacle element.

5. The dispenser of claim 1 wherein said flotation element is comprised of a hollow chamber having a float member disposed therein, said float member having a density of less than that of water.

6. The dispenser of claim 1, composed of two substantially identical vertically divided half sections, each half section having mating edges and comprising a half flotation element, and a half receptacle element, the combination further including respective connector means on said half sections which cooperate to lock said half sections together in abutting contact along their respective mating edges whereby said half sections cooperate to form said dispenser.

7. The dispenser of claim 6 wherein said half sections are each comprised of molded plastic material.

8. The dispenser of claim 6 wherein said half sections are integrally molded plastic half sections and each half section includes a hollow half flotation element, a half receptacle element, at least one of a half divider means within said receptacle element, and at least first and second locking means on said half section disposed at spaced apart locations adjacent said mating edges.

9. The dispenser of claim 8, the combination further including an external lock ring engaging both said half receptacle elements to lock said half receptacle elements together.

10. In a disposable float dispenser, the combination comprising:
   (a) a pair of vertically extending, mating half sections of molded synthetic plastic material locked together to form a flotation element having (i) a flotation element defining a hollow chamber and having a float member disposed therein, said flotation element including a lower wall portion and having a density less than that of water, (ii) a receptacle element depending from said lower wall portion of said flotation element and supported thereby, said receptacle element being a generally cylindrical cage comprised of a pair of vertically extending mating semi-cylindrical members locked together, said receptacle element having an outer wall defining an enclosure with apertures therein disposed over substantially the entire surface thereof for passage of water through said cage enclusre, said receptacle element also including at least one divider disposed within said cage enclosure and extending across said enclosure to divide it into at least two segregated storage compartments, each compartment having said apertures in its outer wall for passage of water therethrough and being adapted to retain and segregate therein a charge of water-soluble material, said divider being provided by portions attached to the inner surface of said outer wall of said semi-cylindrical members and extending inwardly across said enclosure, said divider having apertures therein to permit passage of water therethrough; and
   (b) at least one tablet of water-soluble material, each tablet being segregated in a separate one of said storage compartments, said dispenser being disposable and said divider cooperating with said outer wall to fully segregate said compartments whereby to retain and segregate each said tablet within its associated compartment, said apertures in said outer wall and said divider permitting water to flow through said outer wall and divider into contact with substantially the entire surface of said tablets in any one of said compartments.

11. The dispenser of claim 10 further including an external lock ring engaging both members of said receptacle element to lock said members together.

12. The disposable dispenser of claim 10 further including an external lock engaging both of said half sections to lock said half sections together.

* * * * *